(12) United States Patent
Hasz

(10) Patent No.: US 8,257,833 B2
(45) Date of Patent: Sep. 4, 2012

(54) CERAMIC METALLIC INTERLOCKED COMPONENTS AND METHODS OF MAKING AND USING THE SAME

(75) Inventor: Wayne Charles Hasz, Pownal, VT (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/238,260

(22) Filed: Sep. 21, 2011

(65) Prior Publication Data
US 2012/0009411 A1    Jan. 12, 2012

Related U.S. Application Data

(62) Division of application No. 12/605,640, filed on Oct. 26, 2009, now Pat. No. 8,056,606.

(51) Int. Cl.
*B32B 3/30* (2006.01)
*B32B 15/04* (2006.01)

(52) U.S. Cl. ......... 428/582; 428/614; 428/209; 428/210

(58) Field of Classification Search .................. None
See application file for complete search history.

(56) References Cited

U.S. PATENT DOCUMENTS

| | | | | |
|---|---|---|---|---|
| 1,363,931 A * | 12/1920 | Suckert | ........................... | 313/135 |
| 2,954,495 A * | 9/1960 | Zeller | ........................... | 313/136 |
| 3,629,933 A * | 12/1971 | Sirmay | ........................... | 29/527.6 |
| 4,023,613 A * | 5/1977 | Uebayasi et al. | ........................... | 164/100 |
| 4,427,844 A * | 1/1984 | Saby et al. | ........................... | 174/188 |
| 4,804,905 A * | 2/1989 | Ding et al. | ........................... | 324/662 |
| 5,021,737 A * | 6/1991 | Schutts | ........................... | 324/207.11 |
| 5,119,036 A | 6/1992 | Rickards et al. | | |
| 5,166,626 A * | 11/1992 | Hester et al. | ........................... | 324/690 |
| 5,407,119 A | 4/1995 | Churchill et al. | | |
| 5,881,607 A | 3/1999 | Ito et al. | | |
| 6,105,235 A * | 8/2000 | Caldarise | ........................... | 29/527.5 |
| 6,357,284 B1 | 3/2002 | Kim et al. | | |
| 6,391,173 B1 | 5/2002 | Kim et al. | | |
| 6,672,786 B2 | 1/2004 | Schenk | | |
| 6,877,651 B2 | 4/2005 | Sandin | | |
| 6,949,922 B2 * | 9/2005 | Twerdochlib et al. | ... | 324/207.16 |
| 7,131,483 B2 * | 11/2006 | Osanai et al. | ........................... | 164/419 |

FOREIGN PATENT DOCUMENTS

| | | |
|---|---|---|
| EP | 1775054 A1 | 4/2007 |
| EP | 1495820 B1 | 5/2007 |
| GB | 1518165 | 7/1978 |
| JP | 2008170234 | 1/2007 |
| WO | 9730326 | 8/1997 |
| WO | 2005051630 A1 | 6/2005 |

OTHER PUBLICATIONS

GB1017614.7 Search Report, Jan. 28, 2011.
JP2008170234 Abstract, Jan. 10, 2007.

* cited by examiner

*Primary Examiner* — John J Zimmerman
(74) *Attorney, Agent, or Firm* — Penny A. Clarke

(57) ABSTRACT

A composite element is provided. The composite element includes a ceramic component defining a cavity having a first end and a second end, and a metallic component comprising a head and a body. At least a portion of the body of the metallic component is disposed in the cavity, and the head of the component is disposed on the first end of the cavity. A cross-sectional area of a portion of the body is greater than an area of the first end. In addition, the ceramic and metallic components are interlocked. Methods of making a composite element and of making a clearance sensor part are also provided.

9 Claims, 5 Drawing Sheets

CERAMIC METALLIC INTERLOCKED COMPONENTS AND METHODS OF MAKING AND USING THE SAME

CROSS REFERENCE TO RELATED APPLICATION

This Application is a divisional of U.S. patent application Ser. No. 12/605,640, entitled "Ceramic metallic interlocked components and methods of making and using the same," filed Oct. 26, 2009, now U.S. Pat. No. 8,056,606, which is herein incorporated by reference in its entirety.

BACKGROUND

The invention relates to composite elements having ceramic and metallic components, and more particularly to ceramic and metallic components that are interlocked and methods of making and using the same.

Various types of sensors have been used to measure the distance between two objects. For example, a turbine has a number of turbine blades that are disposed adjacent to a shroud. The clearance between one of the turbine blades and the shroud varies depending on various factors, such as but not limited to, temperature, RPM, load, and age of the turbine. It is desirable that a gap or clearance between the turbine blades and the shroud be maintained for safe and efficient operation of the turbine. A sensor may be disposed within the turbine to measure the distance between the turbine blades and the shroud. The measured distance may be used to direct movement of the shroud to maintain the desired displacement between the shroud and the turbine blades.

Such sensors typically employ a combination of metallic and ceramic components. The metallic components are partially disposed within the ceramic component. Typically, the metallic components and the ceramic components are held together by braze joints. However, since such clearance sensors are primarily employed in harsh environments (such as inside the engine), the high operating temperatures and pressures are challenging for the sensor components, and the braze joints. If the braze joint accidentally fails during the operation, there is a risk of the metallic or ceramic component being liberated into the engine, and possibly damaging the engine.

Accordingly, a need exists for providing a sensor that employs ceramic and metallic components, which will not liberate into the engine during operation. It would also be advantageous to provide an economically viable method of making such a sensor component.

BRIEF DESCRIPTION

In one embodiment, a composite element is provided. The composite element includes a ceramic component defining a cavity having a first end and a second end, and a metallic component comprising a head and a body. At least a portion of the body of the metallic component is disposed in the cavity, and the head of the component is disposed on the first end of the cavity. A cross-sectional area of a portion of the body is greater than an area of the first end, and the ceramic and metallic components are interlocked.

In another embodiment, a method of making a composite element is provided. The composite element comprises a metallic component interlocked with a ceramic component. The method includes providing a ceramic component defining a cavity having a first end and a second end, disposing a degradable material in the cavity, and disposing the ceramic component in an investment. The method further includes removing the degradable material from the cavity, disposing molten metal in the cavity, and solidifying the molten metal to form the metallic component. The metallic component is interlocked with the ceramic component to form the composite element. The method further includes removing the composite element from the mold.

In yet another embodiment, a method of making a clearance sensor part is provided. The method includes providing a ceramic component defining one or more cavities for a metallic component, defining one or more cavities for a sensor case on a side of the ceramic component, and disposing a degradable material in the one or more cavities for the metallic component and the sensor case. The method further includes disposing the ceramic component in an investment, removing the degradable material from the one or more cavities, and disposing molten metal in the one or more cavities.

In another embodiment, a composite element formed using the method of the present invention is provided.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present invention relate to composite elements having interlocked ceramic and metallic components and methods of making and using the same. In particular, the present technique employs a composite element that does not rely upon a braze joint to hold together the ceramic and metallic components. In certain embodiments, the composite element includes a ceramic component having a cavity with a first end and a second end, a metallic component having a head and a body, wherein at least a portion of the body of the metallic component is disposed in the cavity, wherein the head of the component is disposed on the first end of the cavity, and wherein a cross-sectional area of a portion of the body is greater than an area of the first end to provide ceramic and metallic components that are interlocked with each other.

In one non-limiting example, the composite element may be employed in a clearance sensor. Typically, the clearance sensor functions to provide an accurate measurement of clearance between two objects in various systems such as power turbines (for example, steam or gas/oil-fired power turbines, or aircraft engines), a generator, a machine having rotating components and so forth.

Figure 1:
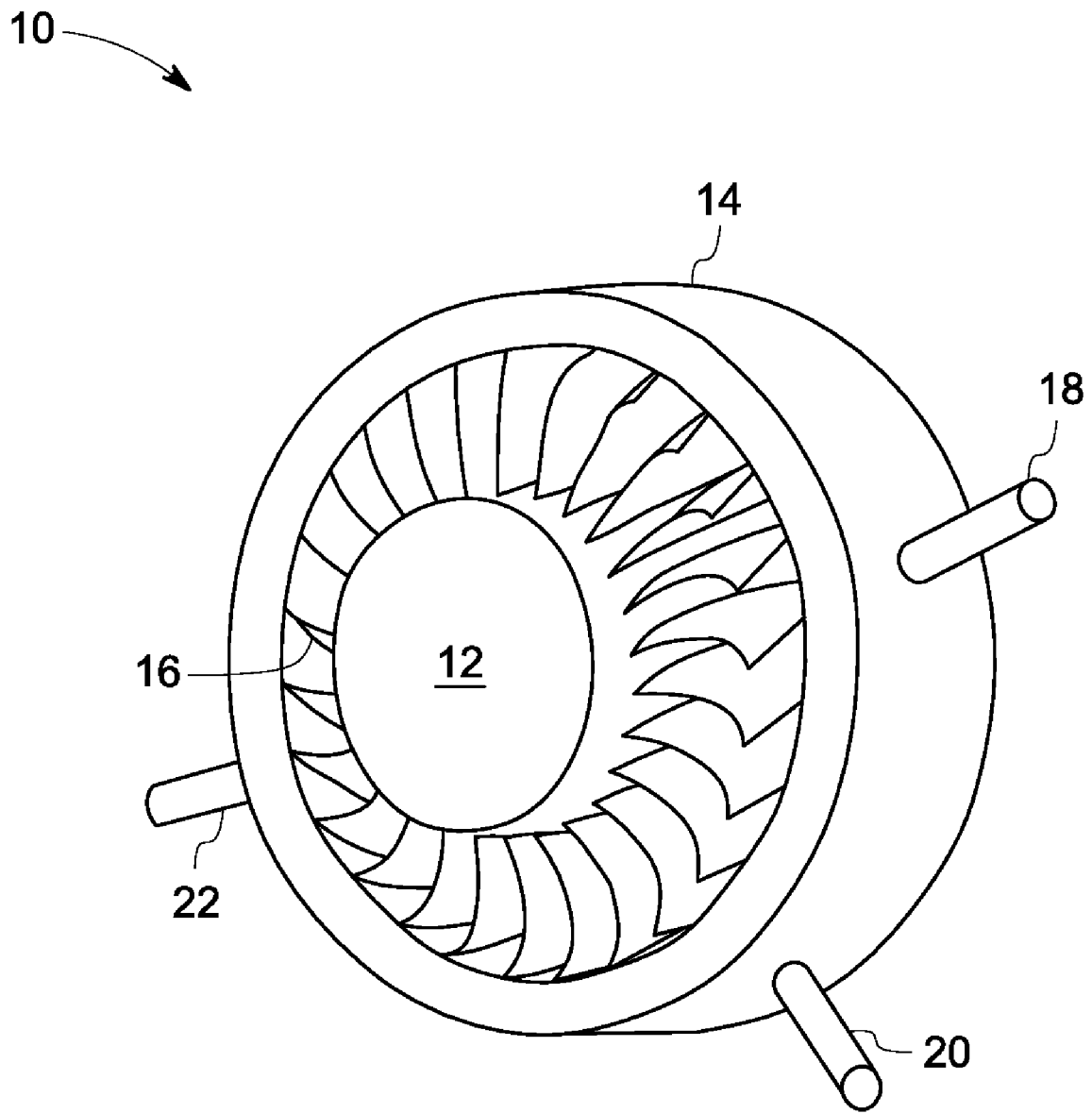
FIG. 1 is a diagrammatical illustration of a turbine having a clearance sensor, in accordance with embodiments of the present technique.

FIG. 1 illustrates a rotating machine, such as a turbine 10, wherein the clearance sensor of the present technique can be incorporated to measure clearance between rotating and stationary components. The steam turbine 10 includes a rotor 12 disposed within a stationary housing 14. A plurality of turbine blades 16, which may also be referred to as buckets, are affixed to the rotor 12. In operation, the blades 16 are subjected to steam or air at a high temperature and pressure, which causes the blades 16 to rotate about an axis. The blades 16 rotate within the stationary housing or shroud 14 that is positioned radially and circumferentially around the blades 16. A relatively small clearance exists between the blades 16 and the shroud 14 to facilitate rotation of the blades 16 within the shroud 14, while also preventing excessive leakage of the working fluid, i.e. steam or air, between the blades 16 and the shroud 14.

In the illustrated example, one or more clearance sensors, such as represented by reference numerals 18, 20 and 22 are disposed circumferentially around the stationary shroud 14. In the illustrated example, each of the clearance sensors 18, 20 and 22 may include a plurality of probe tips configured to generate signals representative of a sensed parameter corresponding to the blades 16. In an exemplary embodiment, the clearance sensors 18, 20 and 22 are capacitive probes and the sensed parameter is capacitance. In another example, the clearance sensors 18, 20 and 22 are eddy current sensors and the sensed parameter is an induced current. Each of the sensors 18, 20 and 22 may be configured to generate a signal indicative of a radial and an axial position of the blades 16 with respect to the shroud 14 at their respective circumferential locations.

Figure 2:
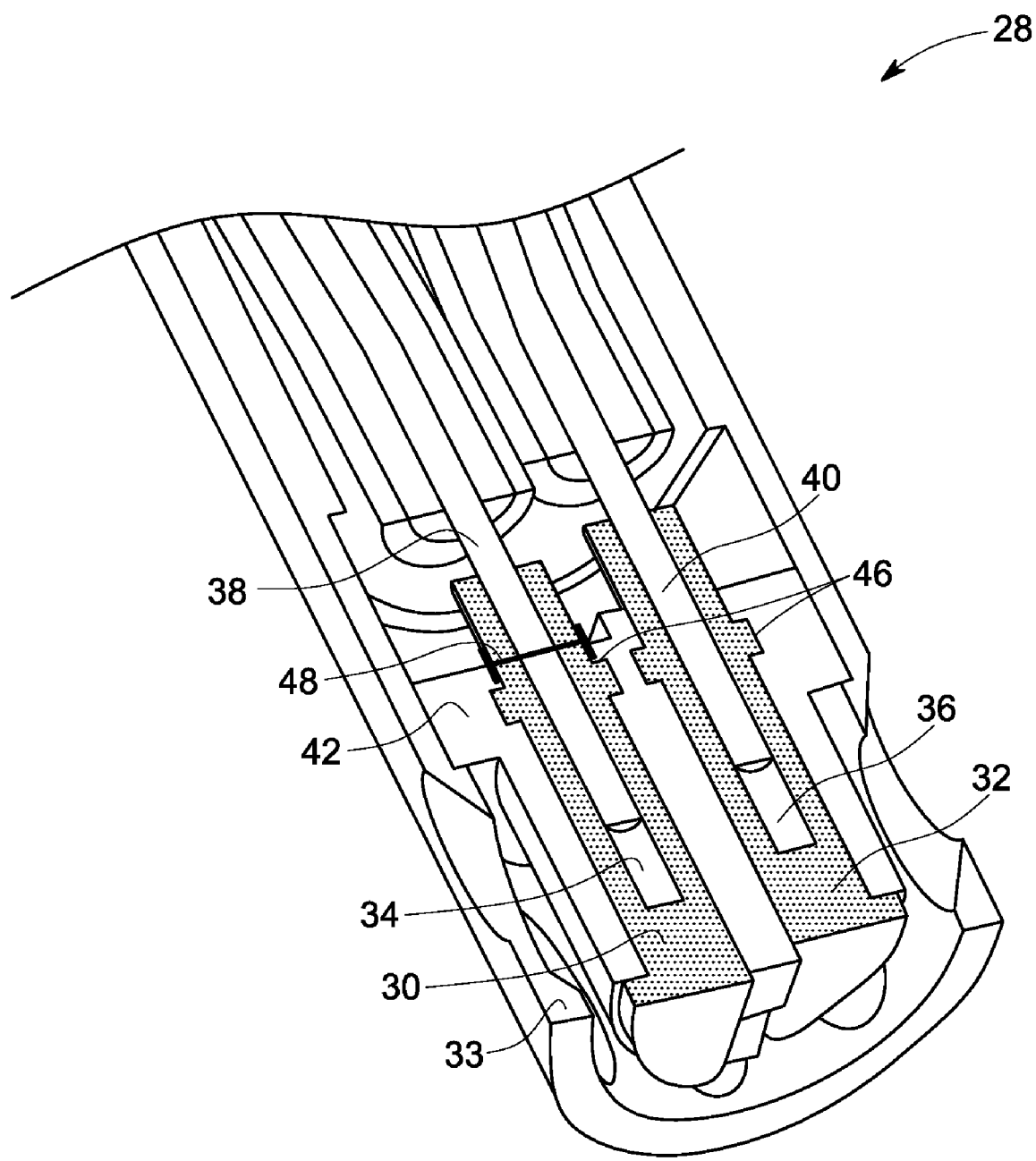
FIG. 2 is a cross-sectional perspective view of a composite element of a clearance sensor, in accordance with embodiments of the present technique.

FIG. 2 illustrates an example of a clearance sensor 28 employing pair of electrode tips 30, 32 within a casing 33, and disposed in close proximity to the turbine blades. The electrode tips 30, 32 may be a single piece formed by casting a molten metal as will be described in detail with regard to FIGS. 3 and 4. The electrode tips 30, 32 define vias 34 and 36 to receive high temperature instrumentation cables 38 and 40 into the cavity to form electrodes. The diameter of the vias 34 and 36 typically depends on the diameter of the cables 38 and 40, and the desired wall thickness at the braze region.

A ceramic component 42 is used to house a portion of the electrode tips 30, 32. The ceramic component 42 may comprise a high temperature ceramic such as alumina. The ceramic component 42 along with the electrode tips 30, 32, forms a composite element having interlocked ceramic-metallic components.

Typically, the electrode tips of such sensors are brazed into a ceramic component. During operation, if the braze joint fails the electrode tips may slide through the ceramic component, and possibly be accidentally liberated in the engine. Advantageously, the shape of the electrode tips 30, 32 of the present technique enables the electrode tip to be interlocked with the ceramic component 42. In other words, the shape of the electrode tip 30 prevents the tip 30 from liberating into the engine during operation. At least a portion 46 of the electrode tips 30, 32 has a cross-sectional area that is greater than the cross-sectional area of the opening 48 in the ceramic component 42, which prevents the electrode tip 30 from coming out of the ceramic component 42.

The electrodes are connected electrically to a voltage source capable of supplying a positive or negative voltage on demand. In one example, one electrode is polarized to a positive voltage and other to a negative potential relative to the outer metallic case 33 of the sensor 28. In operation, the clearance sensor 28 measures the distance between the tip of a turbine blade and the sensing tips 30, 32 of the electrodes by monitoring the capacitance of the air gap between the two.

An example process of operating a clearance measurement system includes receiving a plurality of signals from a sensor having one or more probe tips. The signals are representative of a sensed parameter between first and second objects (for example, between the turbine blades and the shroud). In one embodiment, the sensor is a capacitive probe and the sensed parameter is capacitance. Alternatively, the sensor is an eddy current sensor and the sensed parameter is an induced current. A plurality of simultaneous subsets of sensed parameters are formed. In one example, each simultaneous subset includes sensed parameters from at least two probe tips. Further, the clearance between the first and second objects may be estimated based upon each of the simultaneous subsets of the sensed parameters from the probe tips via a processing unit. In certain embodiments, a look-up table, or a calibration curve, or an analytical table, or a calculation, or combinations thereof may be employed for estimating the clearance based upon the sensed parameters. A processing unit determines the clearance based upon signals from all the probe tips.

Figure 3:
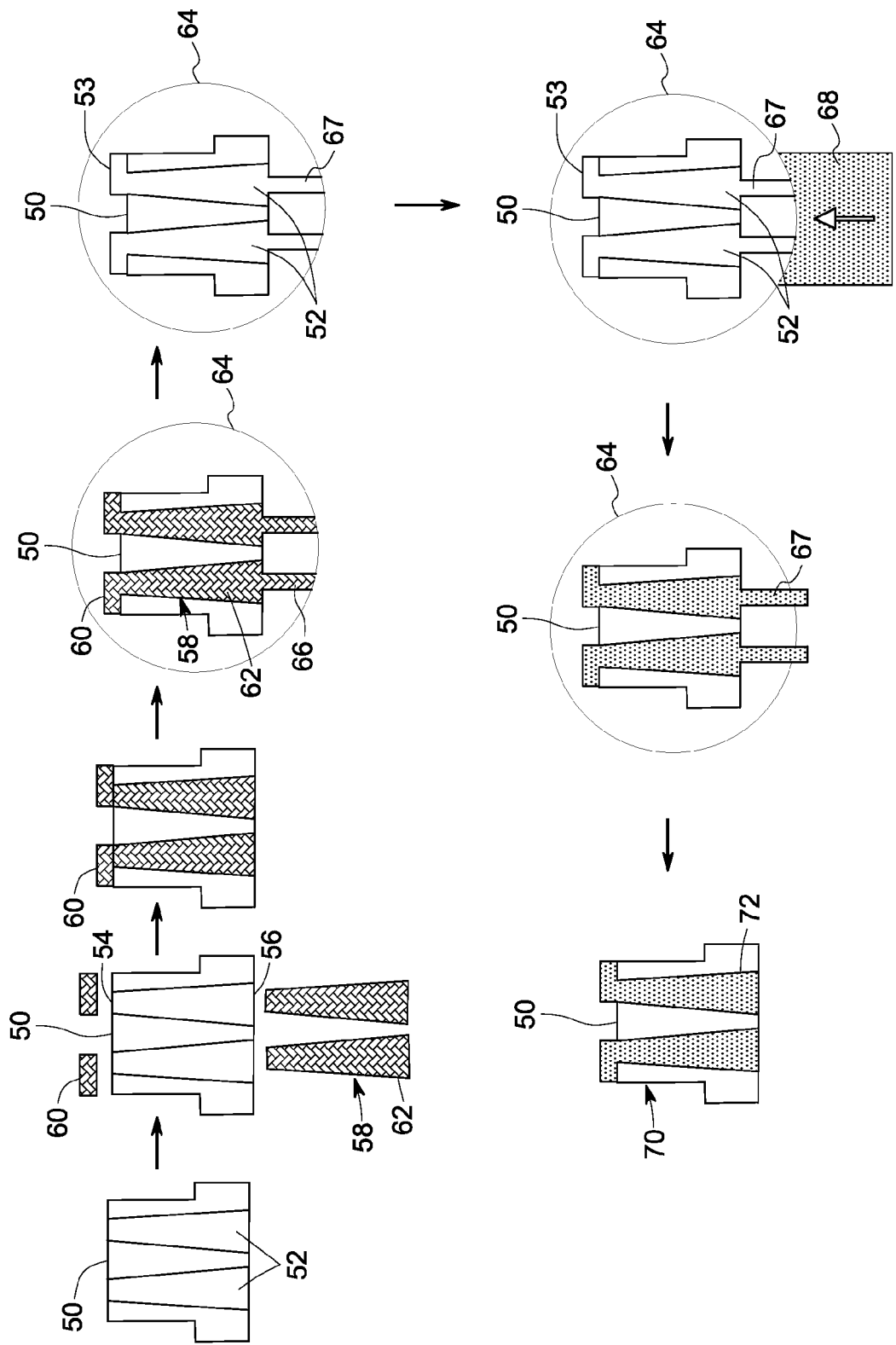
FIGS. 3-4 are schematic flow charts for methods of making composite elements, in accordance with embodiments of the present technique.

FIG. 3 illustrates exemplary steps in a method of making a composite element in accordance with embodiments of the present technique. In the illustrated embodiment, a ceramic component 50 defining cavities 52 is provided. The cavities 52 are employed to house at least a portion of the metallic component that forms the electrode tips. Each of the cavities 52 have a first end 54 and a second end 56. The shape of the cavities 52 in the ceramic component 50 is governed by the desired shape for the metallic component in the composite element. As described above, the shape of the metallic component may be such that the metallic component is not able to pass through the first end 54 of the cavities 52. The shape of the metallic component in the illustrated embodiment is a tapered shape. However, as will be appreciated, other shapes will satisfy the same criterion and can be employed in the composite element.

A disposable pattern 58 of the metallic component may be disposed in the cavities 52. The disposable pattern 58 may be made of a disposable material, such as a wax, polymer, plastic, or combinations thereof. The disposable pattern 58 may be formed, for example, using a direct write process prototype, a rapid prototype, an injection molded prototype, die cast prototype, or combinations thereof. Injection molded and die cast prototype are more economical and can be employed for simpler shapes. As will be appreciated, rapid prototyping is a mostly automated process to create a single prototype directly from data. The processes include three dimensional (3D) printing, fused deposition modeling (FDM), multi jet modeling (MJM), thermojet modeling, stereolithography (SLA), and selective laser sintering (SLS). Different kinds of rapid prototypes may be employed to cast complicated shapes for the metallic component. In one embodiment, the disposable pattern 58 may be formed of two or more parts. In the illustrated embodiment, the disposable pattern 58 is formed from two parts, a head 60 and a body 62. The head 60 and the body 62 may be joined together after disposing the body 62 in the cavity 52, and the head 60 on the first end 54 of the cavity 52.

Further, in the illustrated embodiment, sprue-forming patterns 66 are coupled with the disposable pattern 58 so as to leave a passage 67 to introduce molten metal 68 in the cavities 52 after removal of the disposable pattern 58. The sprue-forming patterns 66 may be constructed of any lightweight structural material, such as aluminum, magnesium, zinc, steel and other similar metals or their alloys plus selected plastics. The basic considerations for sprue-forming patterns 66 are weight, surface smoothness, repairability, and compatibility with investment 64 and material of the disposable pattern.

Next, investment 64 is disposed around the ceramic component 50 having the disposable pattern 58. The ceramic mold employed as investment 64 may be produced by repeating steps including coating, stuccoing, and hardening. Coating includes dipping the ceramic component 50 having the disposable pattern 58 into slurry of fine refractory material and allowing excess slurry to drain off, such that a uniform surface is produced. The fine refractory material provides a smooth surface finish and reproduces fine details. In the second step, the ceramic component 50 having the disposable pattern 58 is stuccoed with a coarse ceramic particle. Stuccoing may be accomplished by performing one or more of dipping into a fluidised bed, placing in a rain sander, or by applying the coarse particles manually. Subsequent to stuccoing, the ceramic coating is allowed to harden. The steps may be repeated until the investment 64 gains the required thickness. In one embodiment, the thickness of the investment 64 may be in a range from about 5 mm to about 15 mm. An alternative to multiple dips is to dispose the ceramic component 50 having the disposable pattern 58 in a container and then pour liquid investment material into the container. In one embodiment, the container may be vibrated (or otherwise agitated) to allow entrapped air to escape and help the investment material fill in all of the details. Suitable materials for investment 64 may include but are not limited to, silica, zircon, alumina, and aluminum silicates.

The investment 64 is then allowed to completely dry. The time period for drying the investment may depend on the material used in the investment 64. In one embodiment, the investment 64 may be dried for a time period in a range from about 10 hours to about 50 hours. Drying may be facilitated by applying a vacuum or minimizing the environmental humidity.

Once the investment 64 has been formed and dried around the ceramic component 50, disposable pattern 58 and sprue-forming patterns 66, the investment 64 is then subjected to a treatment for removal of the sprue-forming patterns 66, and the disposable pattern 58 from the cavities 52. The removal of the disposable pattern 58 from the ceramic component 50 leaves behind cavities 52 and 53. The sprue-forming patterns 66 and the disposable pattern 58 may be removed by any conventional technique. In one embodiment, the investment 64 may be heated in an inverted position to allow the sprue-forming pattern 66 to be removed and the material of the disposable pattern to flow out. The sprue-forming pattern 66 can be re-used with another disposable pattern after it has been removed from the investment 64. Also, the outer surface of the sprue-forming patterns 66 may be coated with a thin coating wax or with a film release agent to facilitate the removal of the patterns 66. In certain embodiments, the material of the disposable pattern may be removed by disposing the investment 64 in a furnace or autoclave to melt out and/or vaporize the material of the disposable pattern.

After removal of the disposable pattern 58, the ceramic component 50 has empty cavities 52 and 53. The desired molten metal 68 for metallic component of the sensor is disposed in the cavities 52 and 53 in the form of a melt. The molten metal may include a single metal, a metal alloy, or a combination of metal alloys. In particular, for applications relating to high temperature clearance sensors, the molten metal 68 may include super-alloys and the platinum group metals and alloys, such as Pt—Rh, Pt—Ir. Lower temperature sensors can be fabricated with lower temperature metals, such as stainless steel, nickel-cobalt-ferrous alloy (for example, Kovar™), and the like. In one example, the cavities 52 and 53 may be filled with molten metal by applying negative pressure. In another example, the filling of the cavities may be assisted by applying positive air pressure, vacuum cast, tilt cast, pressure assisted pouring, centrifugal cast, or centripetal cast. In the embodiment where the molten metal is centripetally cast, the rotation per minute (RPM) of the investment 64 may be in a range from about 100 to about 500. For high RPMs the metal enters the cavities 52 with turbulence, because of the high speeds any sudden change in direction of the molten metal, or any gas obstruction present in the cavities 52 and 53 may shorten the distance the molten metal can flow. However, by decreasing the RPM or reducing the speed of the machine, the molten metal may enter the cavities 52 and 53 in a smooth even flow, and has the ability to push any gas from inside the investment 64 and fill the cavities 52 and 53 to provide clean and porous free castings.

After solidification of the metal, the investment shell 64 is removed to obtain the composite element 70 having the ceramic component 50 and metallic component 72. The investment 64 may be removed by employing one or more techniques, such as but not limited to, hammering, media blasting, vibrating, water-jetting, or chemically dissolving to release the composite element 70. The composite element 70 may then be cleaned up to remove signs of the casting process, usually by grinding.

Although not illustrated, final touch-up machining may be required to complete the composite element. For example, additional features can be machined into the cast metal portion of the sensor. Machining of additional features may include drilling vias, machining final surface finishes, machining mating portions for attachment to the balance of the sensor. For example, vias may be drilled in the metallic component 72. The vias may be employed to receive electronic cable (for instrumentation cable) for sensing purposes. Alternately, a ceramic shape having the shape of the desired via may be disposed in the cavities 52 prior to disposing the molten metal 68 in the cavities 52. The ceramic shape may be made of a low melting point ceramic relative to the ceramic of the component 50 so that the ceramic shape can be removed by heating while the ceramic component 50 remains mostly unharmed.

Figure 4:
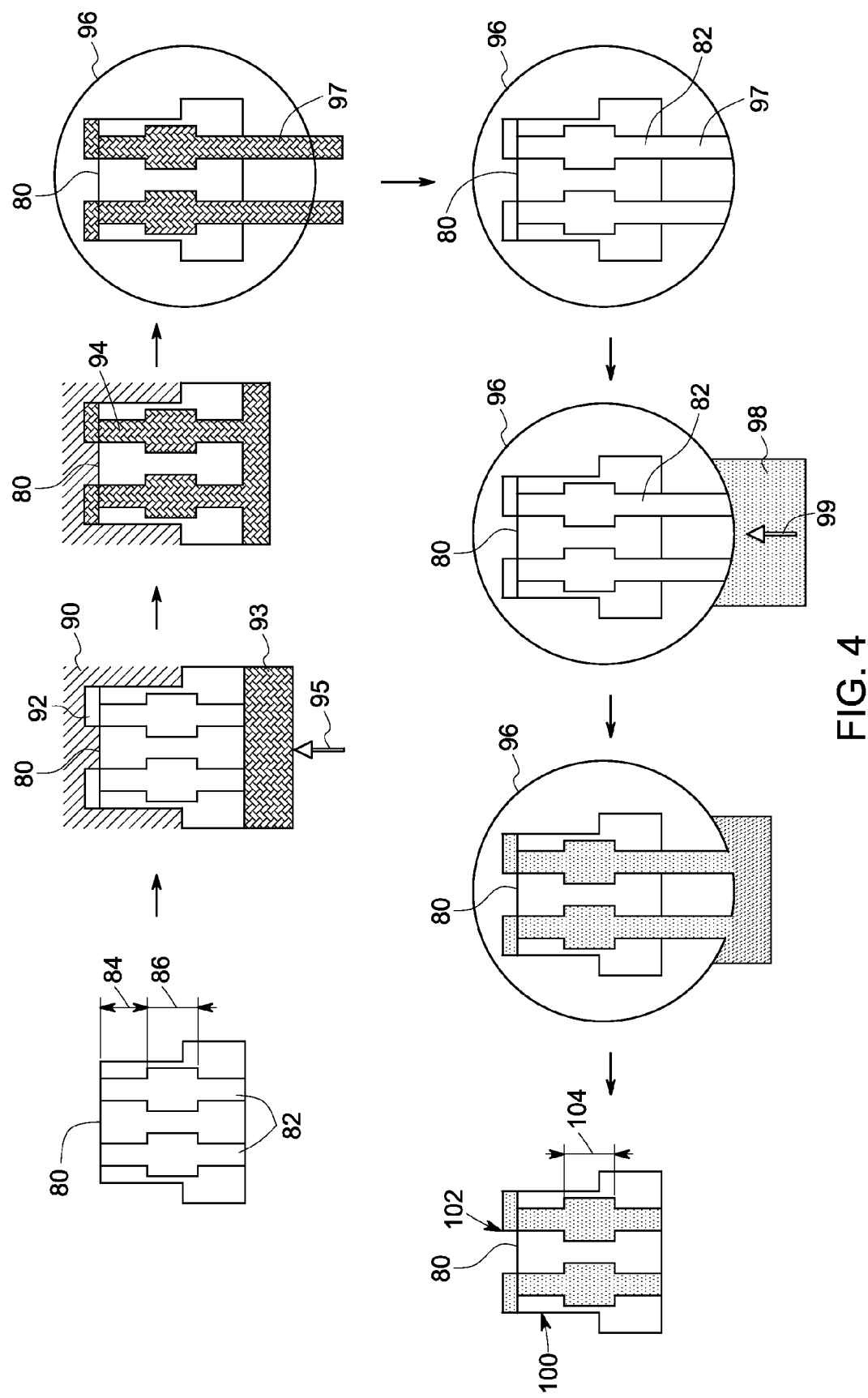

FIG. 4 illustrates an alternate embodiment of a method of making a composite element according to the present technique. The alternate method of FIG. 4 is more suitable for forming metallic components with complex shapes. A ceramic component 80 having cavities 82 is provided. For the illustrated example, the cavities have a narrow section 84 and a broad section 86.

The ceramic component 80 may be disposed in an injection mold die 90. The injection mold die 90 defines a head 92 of the metallic component of the composite element. A liquid polymer 93 may be then pressure injected in the cavities 82. The arrow 95 represents the direction of application of the pressure to the injection mold die 90. Non-limiting examples of the liquid polymer 93 may include liquid vinyl polymer, polyvinyl chloride, acrylic resin, or combinations thereof. The liquid polymer 93 solidifies after being injected in the cavities 82 to form a plastic pattern 94 of the metallic component.

Next, the ceramic component 80 having the plastic component 94 is removed from the injection mold die 90. An investment mold 96 is disposed around the ceramic component 80, while providing feed lines or sprue-forming patterns 97 for the molten metal. The polymer material of the plastic component 94 is removed from the cavities. In certain embodiments, the polymer material may be removed from the cavities 82 and the head 92 either thermally or by chemical treatment. The polymer material is then removed from the cavities by employing methods described above with respect to FIG. 3.

Molten metal 98 is disposed in the cavities 82 and the head 92. The molten metal may be disposed by using pressure injection (arrow 99). A negative or centripetal pressure may be applied to assist in filling the molten metal in the cavities 82 and the head 92. The investment 96 is subsequently removed to obtain composite element 100 having a ceramic component 80 and a metallic component 102.

The broad portion 104 of the metallic component 102 interlocks with the ceramic components 80. The interlock prevents the release of the metallic component 102 into the engine during operation.

In one embodiment, the investment mold may be disposed around the ceramic component such that the mold defines the cavities around the ceramic component. A disposable pattern or a liquid polymer may be disposed in these cavities outside the ceramic component. In later stages of the process, the cavities may be filled with molten metal to form a metal case around the composite element of the clearance sensor.

Figure 5:
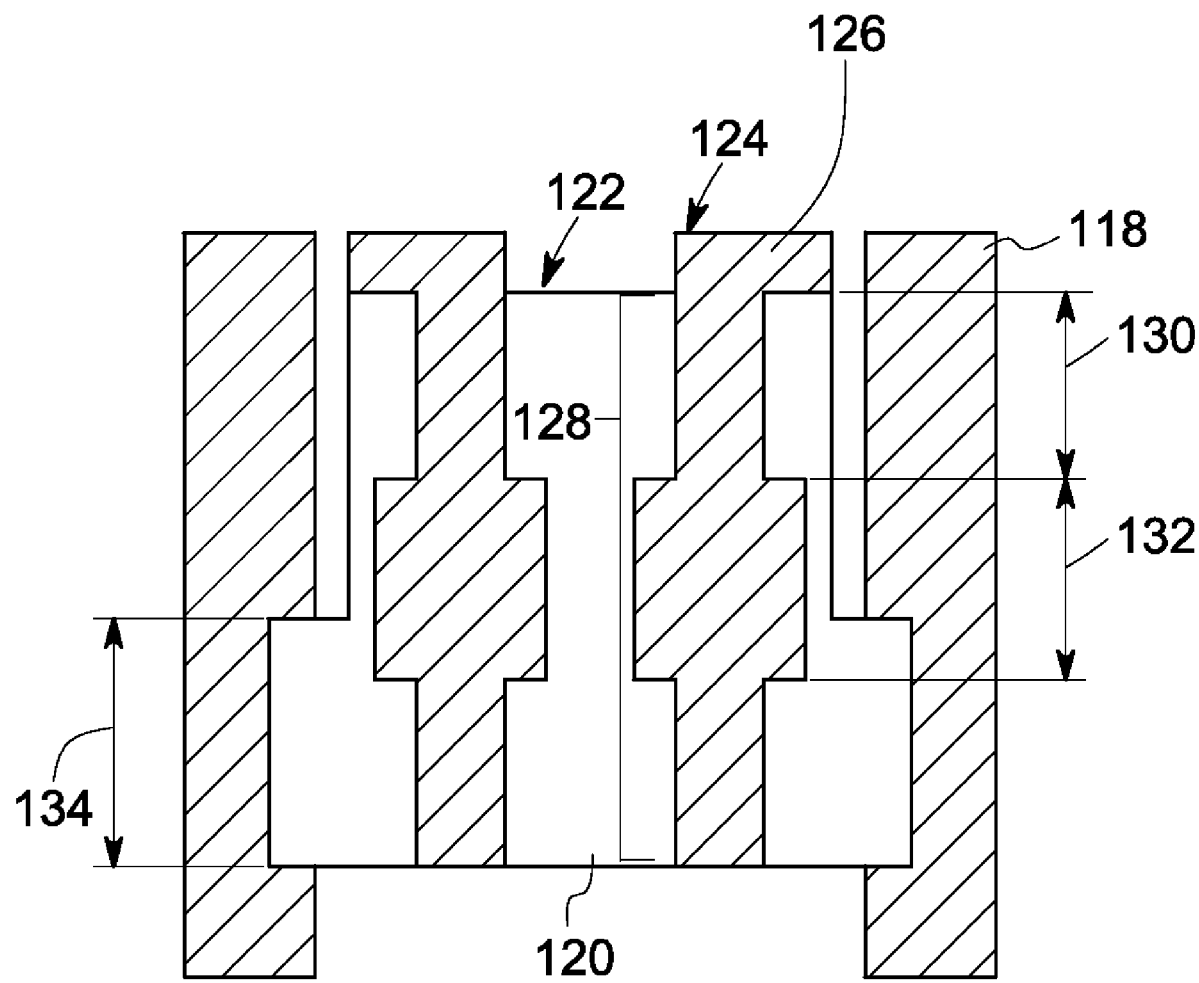
FIG. 5 is a cross-sectional side view of a composite element disposed in a metallic case, in accordance with embodiments of the present technique.

As illustrated in FIG. 5, in certain embodiments, a metallic case 118 is formed around the composite element 122 during the same step as that of forming the metallic component 124 that is interlocked with the ceramic component 120. In these embodiments, a disposable pattern may be disposed in place for the metallic case 118, and another disposable pattern may be disposed in place for the metallic component 124. The remaining steps of the method are similar to the method steps described above with regard to FIGS. 3 and 4. Metallic component 124 includes a head 126 and a body 128. The body 128 includes a narrow portion 130 and a broad portion 132. The broad portion 132 having the metallic component 124 prevents the metallic component 124 from liberating into the engine during operation. The ceramic is also interlocked within the outer metallic case 118, as defined by region 134.

The various aspects of the composite element and the methods of making the composite element described hereinabove have utility in different applications. For example, the composite element illustrated above may be used for measuring the clearance between rotating and static components in a power turbine. The resulting composite element may also be used in certain other applications, for example, for measuring clearance between stationary and rotating components in generators. Although the present technique has been mostly discussed with regard to clearance sensors, it should be noted that the composite elements of the present technique may be employed in several other applications, such as ignitors, spark plugs, pressure gauges, and oxygen sensors.

Complicated shapes may be prepared from alloys and superalloys by employing the above methods by employing suitable techniques such as but not limited to, injection molding, transfer molding, and the like. In addition, the present technique provides an economical way of producing composite elements having both ceramic and metallic components.

While only certain features of the invention have been illustrated and described herein, many modifications and changes will occur to those skilled in the art. It is, therefore, to be understood that the appended claims are intended to cover all such modifications and changes as fall within the scope of the invention.

The invention claimed is:

1. A composite element comprising:
    a ceramic component defining a cavity having a first end and a second end; and
    a metallic component comprising a head and a body, wherein at least a portion of the body of the metallic component is disposed in the cavity, wherein the head of the metallic component is disposed on the first end of the cavity, wherein a cross-sectional area of a portion of the body of the metallic component is configured to interlock the metallic component with the ceramic component, and wherein the cross-sectional area of the portion of the body of the metallic component is greater than an area of the first end of the cavity to facilitate interlocking of the metallic component with the ceramic component.

2. The composite element of claim 1, wherein the body has a tapered shape.

3. The composite element of claim 1, wherein the head comprises a platinum containing alloy.

4. The composite element of claim 1, wherein the body and the head form a single, continuous element.

5. The composite element of claim 4, wherein the metallic component is a single piece formed by casting a molten metal.

6. A composite element formed using a method comprising:
    providing a ceramic component defining a cavity having a first end and a second end;
    disposing a degradable material in the cavity;
    disposing the ceramic component in an investment;
    removing the degradable material from the cavity;
    disposing molten metal in the cavity;
    solidifying the molten metal to form a metallic component comprising a head and a body, wherein at least a portion of the body of the metallic component is disposed in the cavity, wherein the head of the metallic component is disposed on the first end of the cavity, wherein a cross-sectional area of a portion of the body of the metallic component is configured to interlock the metallic component with the ceramic component, and wherein the cross-sectional area of the portion of the body of the metallic component is greater than an area of the first end of the cavity to facilitate interlocking of the metallic component with the ceramic component; and
    removing the composite element from the mold.

7. The composite element of claim 6, wherein the method further comprises providing an additional feature in the metallic component.

8. The composite element of claim 7, wherein the additional feature is machined into the metallic component.

9. The composite element of claim 7, wherein the additional feature comprises a via, and wherein providing the via comprises:
    disposing a ceramic shape in the cavity prior to disposing the molten metal in the cavity; and
    removing the ceramic shape after forming the metallic component.

* * * * *